(12) United States Patent
Wiggan (10) Patent No.: US 11,787,318 B1
(45) Date of Patent: Oct. 17, 2023

(54) BENCH SEAT COVER ASSEMBLY

(71) Applicant: Josette Wiggan, Los Angeles, CA (US)

(72) Inventor: Josette Wiggan, Los Angeles, CA (US)

(*) Notice: Subject to any disclaimer, the term of this patent is extended or adjusted under 35 U.S.C. 154(b) by 0 days.

(21) Appl. No.: 17/867,865

(22) Filed: Jul. 19, 2022

(51) Int. Cl.
*B60N 2/60* (2006.01)
*B60N 2/58* (2006.01)

(52) U.S. Cl.
CPC .................. *B60N 2/5825* (2013.01)

(58) Field of Classification Search
CPC ...... B60N 2/6009; B60N 2/60; B60N 2/6018; B60N 2/6027; A01K 1/0272
See application file for complete search history.

(56) References Cited

U.S. PATENT DOCUMENTS

| | | | | |
|---|---|---|---|---|
| 1,959,974 | A * | 5/1934 | Westgate | B60R 21/06 5/98.1 |
| 4,924,814 | A | 5/1990 | Beaudet | |
| 4,943,105 | A | 7/1990 | Kacar | |
| 6,659,551 | B1 * | 12/2003 | Arenas | B60N 2/6063 297/229 |
| 7,287,813 | B2 | 10/2007 | Aliev | |
| 7,661,748 | B2 | 2/2010 | Abraham | |
| 7,717,484 | B2 * | 5/2010 | Parle | B60R 21/06 296/24.46 |
| 10,081,278 | B1 * | 9/2018 | Balzer | B60N 2/60 |
| 10,406,951 | B2 * | 9/2019 | Leon Guerrero | B60N 2/6009 |
| 10,960,798 | B1 * | 3/2021 | Li | B60N 2/876 |
| 11,006,612 | B2 | 5/2021 | Ryan | |
| D923,974 | S | 7/2021 | Xu | |
| 11,432,527 | B1 * | 9/2022 | Pan | B60N 2/6027 |
| 2008/0179926 | A1 | 7/2008 | Kushner | |
| 2015/0264887 | A1 | 9/2015 | Pamess | |
| 2016/0318430 | A1 * | 11/2016 | Umlauf | B60N 2/90 |
| 2016/0325660 | A1 * | 11/2016 | Umlauf | B60N 2/6018 |
| 2019/0029217 | A1 * | 1/2019 | Ryan | A01K 1/0353 |
| 2019/0106034 | A1 * | 4/2019 | Leon Guerrero | B60N 2/3045 |
| 2020/0223336 | A1 * | 7/2020 | Conti | B60N 2/6018 |
| 2022/0061264 | A1 * | 3/2022 | Pan | B60N 2/6027 |
| 2023/0042946 | A1 * | 2/2023 | Vermeer | B60N 2/6063 |
| 2023/0095604 | A1 * | 3/2023 | Krumbein | B60N 2/6009 297/250.1 |

FOREIGN PATENT DOCUMENTS

GB 2423016 8/2006

* cited by examiner

*Primary Examiner* — Shin H Kim (57) ABSTRACT

A bench seat cover assembly includes a slip cover that has a seat portion forming an angle with a backrest portion thereby facilitating the slip cover to be positioned over a bench seat in a vehicle. A pair of elastomeric belts is each coupled to the seat portion of the clip cover and a pair of securing belts is each coupled to the seat portion of the clip cover. Each of the securing belts is releasably matable to a respective one of the elastomeric belts for securing the set portion on the seat of the bench seat. A pair of floor flaps each extends away from the seat portion of the slip cover thereby facilitating each of the floor flaps to lie on a floor of the vehicle when the slip cover is positioned over the bench seat.

10 Claims, 6 Drawing Sheets

BENCH SEAT COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seat cover devices and more particularly pertains to a new seat cover device for protecting a bench seat in a vehicle from pet hair and other contaminants. The device includes a slip cover that is structured to be positionable over a bench seat in a vehicle. The device includes a pair of elastomeric belts and a pair of securing belts that attached to the slip cover and which are wrapped around the bench seat. The device includes a center console flap for accommodating a center console of the bench seat and a pair of floor flaps that are attached to the slip cover and which rest on the floor.

(2) Description of Related Art Including Information Disclosed Under 37 CFR 1.97 and 1.98

The prior art relates to seat cover devices including a pet restraint for a bench seat of a vehicle that includes a blanket that is positionable over the bench seat and a net suspended in front of the blanket. The prior art discloses a seat cover that includes a panel that is comprised of a plurality of foldable sections for covering a vehicle seat and defining a barrier in front of the vehicle seat. The prior art discloses a vehicle seat cover that includes a slip cover for a single passenger seat in a vehicle and a floor panel attached to the slip cover for covering a floor of the vehicle. The prior art discloses a panel that is shaped for conform to a bench seat of a vehicle and which includes a rolled lip for capturing fluids. The prior art discloses a pet restraint device that includes a panel that includes LATCH (lower anchors and tethers for children) mechanisms.

BRIEF SUMMARY OF THE INVENTION

An embodiment of the disclosure meets the needs presented above by generally comprising a slip cover that has a seat portion forming an angle with a backrest portion thereby facilitating the slip cover to be positioned over a bench seat in a vehicle. A pair of elastomeric belts is each coupled to the seat portion of the clip cover and a pair of securing belts is each coupled to the seat portion of the clip cover. Each of the securing belts is releasably matable to a respective one of the elastomeric belts for securing the set portion on the seat of the bench seat. A pair of floor flaps each extends away from the seat portion of the slip cover thereby facilitating each of the floor flaps to lie on a floor of the vehicle when the slip cover is positioned over the bench seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
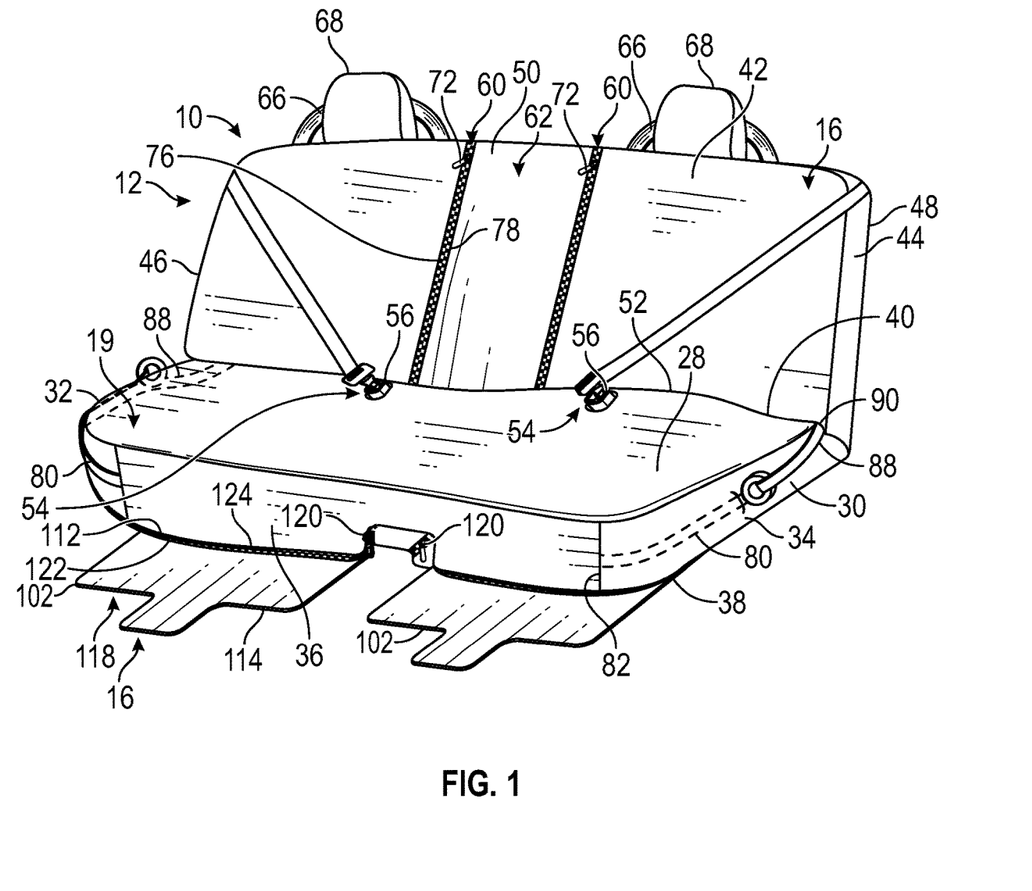
FIG. 1 is a front perspective in-use view of a bench seat cover assembly according to an embodiment of the disclosure.
Figure 2:
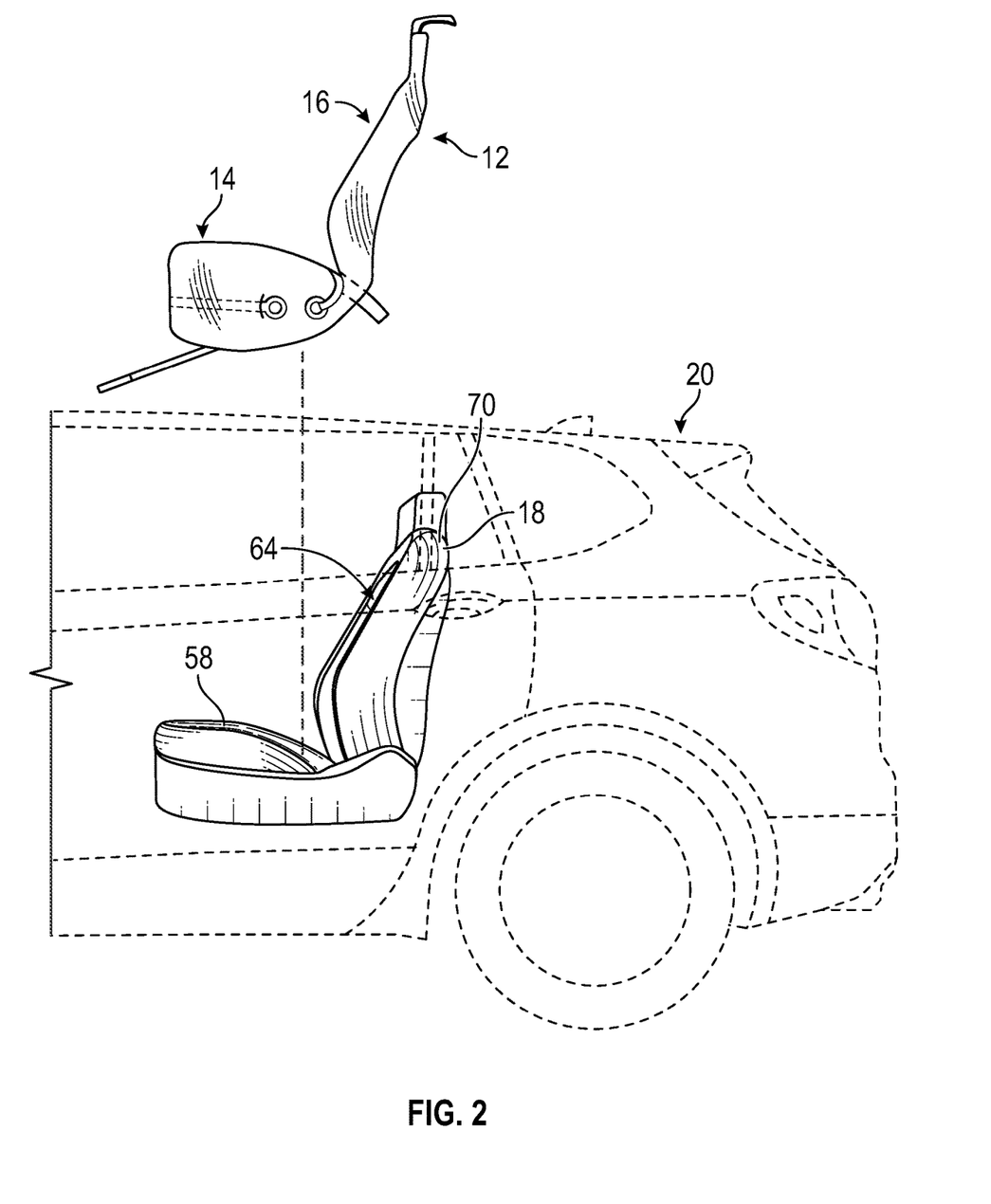
FIG. 2 is an exploded perspective in-use view of an embodiment of the disclosure.
Figure 3:
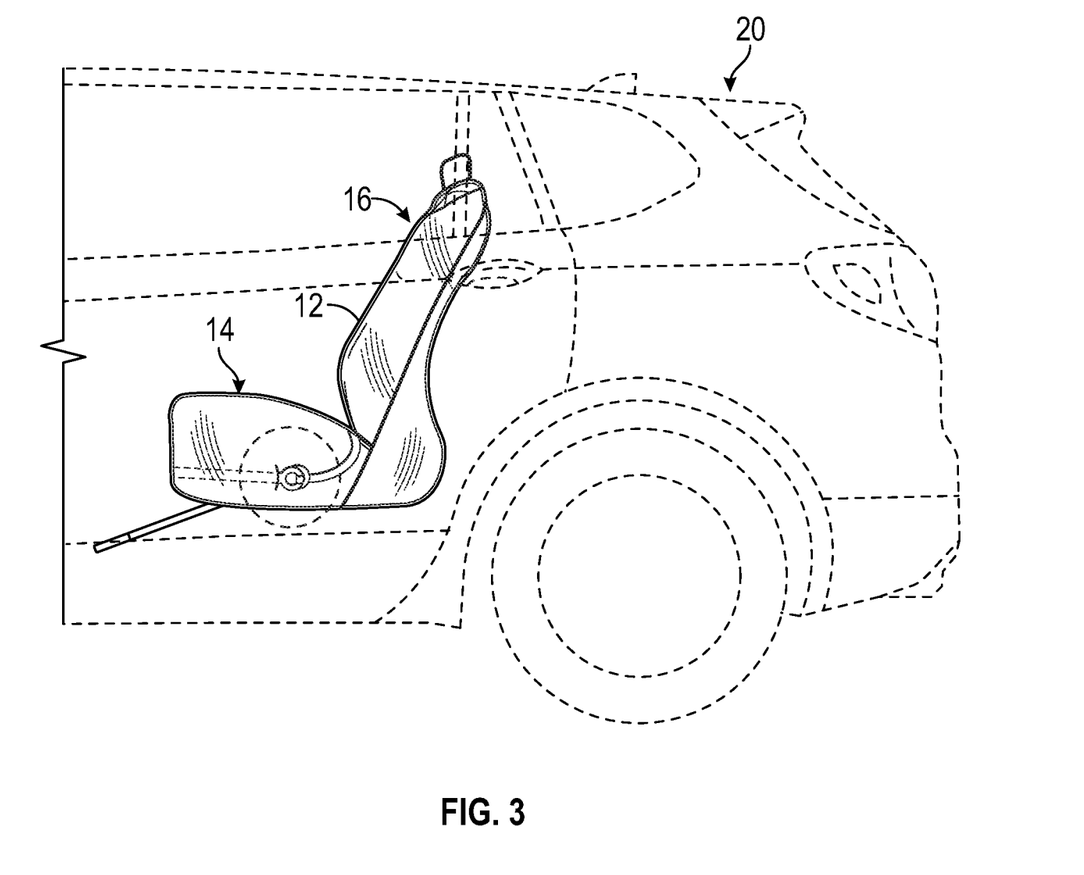
FIG. 3 is a phantom perspective in-use view of an embodiment of the disclosure.
Figure 4:
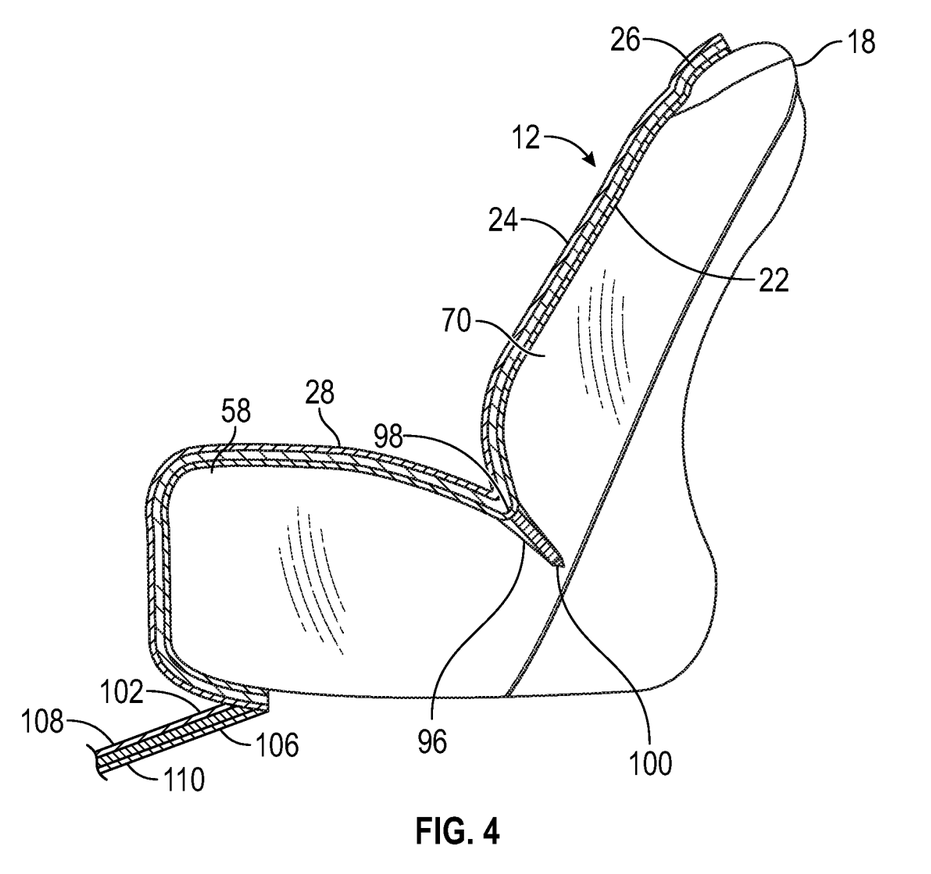
FIG. 4 is a cross sectional view taken along line 4-4 of FIG. 1 of an embodiment of the disclosure.
Figure 5:
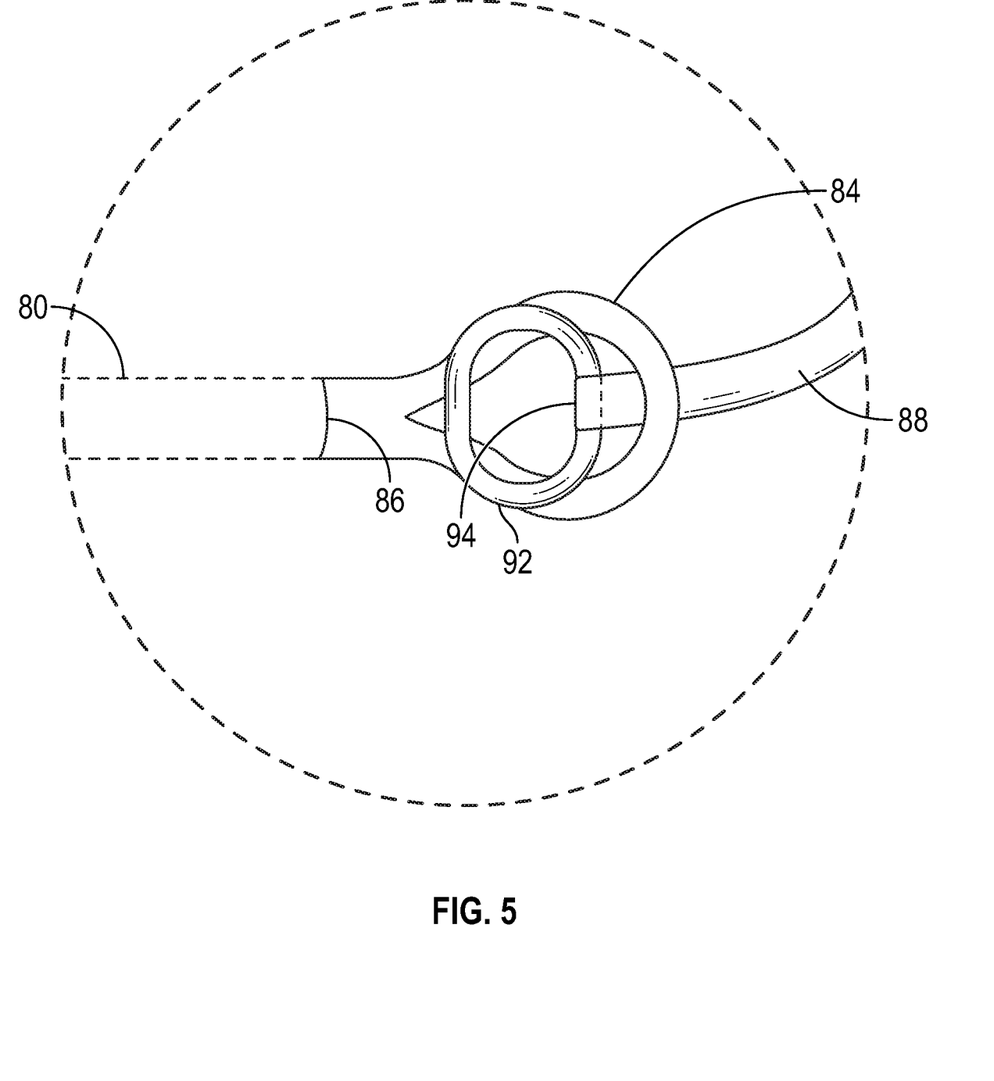
FIG. 5 is a detail view taken from circle 5 of FIG. 3 of an embodiment of the disclosure.
Figure 6:
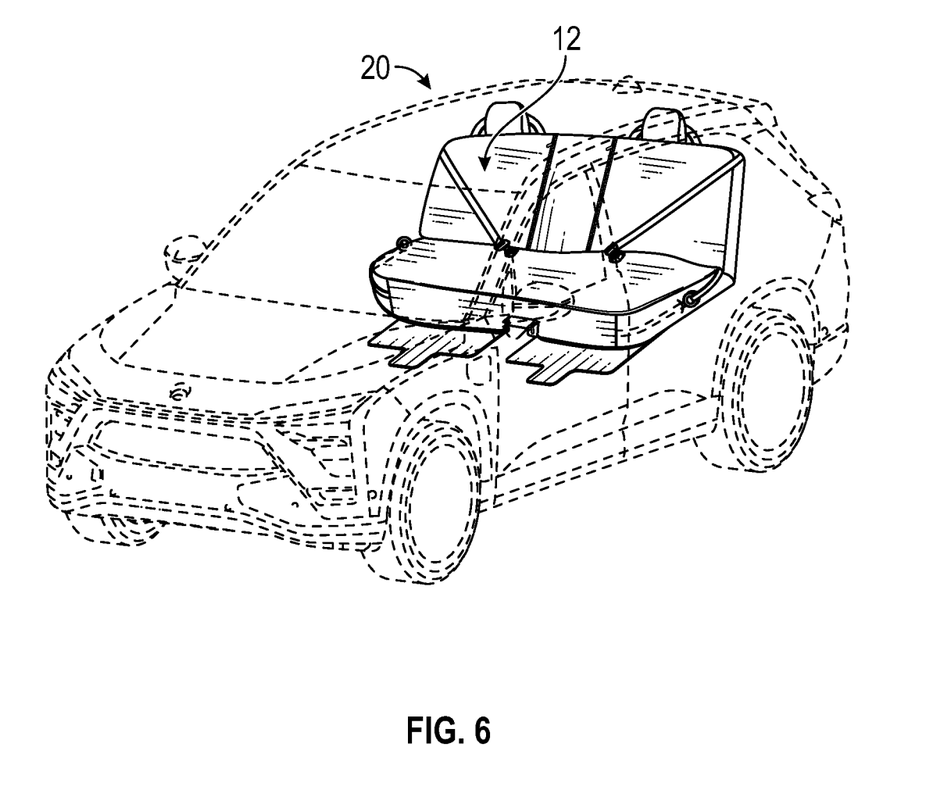
FIG. 6 is a phantom perspective in-use view of an embodiment of the disclosure.

With reference now to the drawings, and in particular to FIGS. 1 through 6 thereof, a new seat cover device embodying the principles and concepts of an embodiment of the disclosure and generally designated by the reference numeral 10 will be described.

As best illustrated in FIGS. 1 through 6, the bench seat cover assembly 10 generally comprises a slip cover 12 that has a seat portion 14 forming an angle with a backrest portion 16 thereby facilitating the slip cover 12 to be positioned over a bench seat 18 in a vehicle 20. The vehicle 20 may be a passenger vehicle, such as a sedan, a cargo vehicle or any other motorized vehicle that is driven on public roadways. The slip cover 12 is comprised of a rip resistant material thereby facilitating domesticated pets, such as dogs for example, to walk on the slip cover 12 without damaging the slip cover 12. Additionally, the slip cover 12 is comprised of a fluid impermeable material thereby inhibiting fluid spilled on the slip cover 12 from coming into contact with the bench seat 18.

The slip cover 12 comprises an inner layer 22, an outer layer 24 and a middle layer 26 positioned between the inner layer 22 and the outer layer 24. The inner layer 22 may be comprised of a fluid impermeable material, including but not being limited to, rubber and the inner layer 22 rests against the bench seat 18. The outer layer 24 may be comprised of a rip resistant material, including but not being limited to, polyester or other rip resistant textile. The middle layer 26 may be comprised of a fluid permeable material, including but not being limited to, cotton or other organic textile.

The seat portion 14 has an upper wall 28 and a perimeter wall 30 extending around a substantial perimeter of the upper wall 28, and the perimeter wall 30 extends downwardly from the upper wall 28. The perimeter wall 30 has a first lateral side 32, a second lateral side 34 and a front side 36. Additionally, the perimeter wall 30 has a bottom edge 38 and the upper wall 28 has a rear edge 40. The backrest portion 16 has a front wall 42 and a peripheral wall 44 extending around a substantial perimeter of the front wall 42, and the peripheral wall 44 has a first lateral side 46, a second lateral side 48 and a top side 50. The front wall 42 has a lower edge 52 and the lower edge 52 is coupled to the rear edge 40 of the upper wall 28 such that the front wall 42 forms an angle with the upper wall 28.

The slip cover 12 has a pair of seatbelt holes 54 extending through the upper wall 28 thereby facilitating a pair of seatbelt buckles 56 to be extended through a respective seatbelt hole 54 when the seat portion 14 is positioned on a seat 58 of the bench seat 18. The seatbelt holes 54 are positioned adjacent to the rear edge 40 of the upper wall 28. The backrest portion 16 has a pair of cuts 60 each extending through the top side 50 of the peripheral wall 44 and the front wall 42 to terminate at the lower edge 52 of the front wall 42. In this way a center console flap 62 is defined between the cuts 60 to facilitate a center console 64 of the bench seat 18 to be positioned in a lowered position.

A pair of straps 66 is provided and each of the straps 66 is coupled to the backrest portion 16 of the slip cover 12. Each of the straps 66 forms a closed loop thereby facilitating each of the straps 66 to be positioned around a respective one of a pair of headrests 68 on the bench seat 18 for securing the backrest portion 16 on a backrest 70 of the bench seat 18. Each of the straps 66 is positioned on the top side 50 of the peripheral wall 44 of the backrest portion 16. Each of the straps 66 is strategically positioned along the top side 50 to match the location of the respective headrest on the bench seat 18.

A pair of first couplers 72 is provided and each of the first couplers 72 is integrated into a bounding edge 74 of a respective one of the cuts 60 in the front wall 42 of the backrest portion 16. Each of the first couplers 72 comprises a first portion 76 that is matable to a second portion 78. Each of the first portion 76 and the second portion 78 extends along opposite sides of the bounding edge 74 of the respective cut 60 for opening and closing the respective cut 60. Each of the first couplers 72 may comprise a zipper or other type of releasable, mechanical coupler.

A pair of elastomeric belts 80 is provided and each of the first elastomeric belts 80 is coupled to the seat portion 14 of the slip cover 12. Each of the elastomeric belts 80 has a coupled end 82 that is coupled to an intersection between the front side 36 and a respective one of the first lateral side 32 and the second lateral side 34 of the perimeter wall 30 of the seat portion 14. Additionally, a ring 84 is disposed on a distal end 86 of each of the elastomeric belts 80 and the ring 84 on each of the elastomeric belts 80 is comprised of a resiliently stretchable material.

A pair of securing belts 88 is provided and each of the securing belts 88 is coupled to the seat portion 14 of the slip cover 12. Each of the securing belts 88 is releasably matable to a respective one of the elastomeric belts 80 for securing the set portion on the seat 58 of the bench seat 18. Each of the securing belts 88 has a coupled end 90 that is coupled to the upper wall 28 of the seat portion 14. Additionally, each of the securing belts 88 extends forwardly along a respective one of the first lateral side 32 and the second lateral side 34 of the perimeter wall 30 of the seat portion 14. A ring 92 is disposed on a distal end 94 of each of the securing belts 88 and the ring 84 on each of the elastomeric belts 80 is stretchable around the ring 92 on a respective one of the securing belts 88. Furthermore, the ring 92 on each of the securing belts 88 is comprised of a rigid material thereby facilitating the ring 84 on each of the elastomeric belts 80 to be retained around the ring 92 on the respective securing belt 88.

An anchor 96 is coupled to the slip cover 12 and the anchor 96 slides between the seat 58 and the backrest 70 of the bench seat 18 when the slip cover 12 is positioned over the bench seat 18 for securing the slip cover 12 to the bench seat 18. The anchor 96 has a first edge 98 and a second edge 100, and the first edge 98 is coupled an intersection between the rear edge 40 of the upper wall 28 of the seat portion 14 and the lower edge 52 of the front wall 42 of the backrest portion 16. The anchor 96 tapers to a point at the second edge 100 thereby facilitating the second edge 100 to slip between the seat 58 and the backrest 70 of the bench seat 18. The anchor 96 extends rearwardly away from the slip cover 12 such that the anchor 96 is concealed when the slip cover 12 is positioned over the bench seat 18.

A pair of floor flaps 102 is provided and each of the floor flaps 102 is movably attached to the slip cover 12. Each of the floor flaps 102 extends away from the seat portion 14 of the slip cover 12 thereby facilitating each of the floor flaps 102 to lie on a floor 104 of the vehicle 20 when the slip cover 12 is positioned over the bench seat 18. Each of the floor flaps 102 is comprised of a rip resistant material thereby facilitating domesticated pets to walk on the floor flaps 102 without damaging the floor flaps 102. Additionally, each of the floor flaps 102 is comprised of a fluid impermeable material thereby inhibiting fluid spilled on the floor flaps 102 from coming into contact with the floor 104.

Each of the floor flaps 102 comprises an inner layer 106, an outer layer 108 and a middle layer 110 that is positioned between the inner layer 106 and the outer layer 18 of the floor flaps 102. The inner layer 106 of each of the floor flaps 102 may be comprised of a fluid impermeable material, including but not being limited to, rubber and the inner layer of the floor flaps 102 rests against the floor. The outer layer 108 of each of the floor flaps 102 may be comprised of a rip resistant material, including but not being limited to, polyester or other rip resistant textile. The middle layer 110 of each of the floor flaps 102 may comprise a fluid permeable material, including but not being limited to, cotton or other organic textile. Each of the floor flaps 102 has a back edge 112 and a front edge 114, and the front edge 114 of each of the floor flaps 102 has a first section 116 that is spaced away from a second section 118. The first section 116 is centrally positioned along the second section 118 and the first section 116 has a width that is less than a width of the second section 118.

A pair of second couplers 120 is provided and each of the second couplers 120 comprises a primary portion 122 that is coupled to the bottom edge 38 of the perimeter wall 30 of the seat portion 14 of the slip cover 12. Each of the second couplers 120 comprises a secondary portion 124 that is coupled to the back edge 112 of a respective one of the floor flaps 102. The primary portion 122 of a respective second couplers 120 releasably engages the secondary portion 124 of the respective second coupler 120 for removably retaining the floor flaps 102 on the seat portion 14 of the slip cover 12. Each of the second couplers 120 may comprise a zipper or other type of releasable, mechanical coupler.

In use, the slip cover 12 is positioned over the bench seat 18 such that the anchor 96 slips between the seat 58 and the backrest 70 of the bench seat 18 and each of the straps 66 is positioned over the respective headrest 68. Each of the elastomeric belts 80 is secured to a respective securing belt 88 to tighten the seat portion 14 of the slip cover 12 around the seat 58 of the bench seat 18. Additionally, each of the floor flaps 102 can be attached to the slip cover 12 to protect the floor 104 in front of the bench seat 18. In this way a domesticated animal can walk or sit on the bench seat 18 without covering the bench seat 18 in animal hair. Additionally, the slip cover 12 protects the bench seat 18 from urine from the domesticated animal, for example, or other fluid that might be spilled on the slip cover 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bench seat cover assembly for protecting a bench seat and carpet in a vehicle from pet hair and other contaminants, said assembly comprising:
   a slip cover having a seat portion forming an angle with a backrest portion thereby facilitating said slip cover to be positioned over a bench seat in a vehicle, said slip cover being comprised of a rip resistant material thereby facilitating domesticated pets to walk on said slip cover without damaging said slip cover, said slip cover being comprised of a fluid impermeable material thereby inhibiting fluid spilled on said slip cover from coming into contact with the bench seat;
   a pair of straps, each of said straps being coupled to said backrest portion of said slip cover, each of said straps forming a closed loop thereby facilitating each of said straps to be positioned around a respective one of a pair of headrests on the bench seat for securing said backrest portion on a backrest of the bench seat;
   a pair of elastomeric belts, each of said first elastomeric belts being coupled to said seat portion of said clip cover;
   a pair of securing belts, each of said securing belts being coupled to said seat portion of said clip cover, each of said securing belts being releasably matable to a respective one of said elastomeric belts for securing said set portion on the seat of the bench seat;
   an anchor being coupled to said slip cover, said anchor sliding between the seat and the backrest of the bench seat when said slip cover is positioned over the bench seat for securing said slip cover to the bench seat; and
   a pair of floor flaps, each of said floor flaps being movably attached to said slip cover, each of said floor flaps extending away from said seat portion of said slip cover thereby facilitating each of said floor flaps to lie on a floor of the vehicle when said slip cover is positioned over the bench seat, each of said floor flaps being comprised of a rip resistant material thereby facilitating domesticated pets to walk on said floor flaps without damaging said floor flaps, each of said floor flaps being comprised of a fluid impermeable material thereby inhibiting fluid spilled on said floor flaps from coming into contact with the floor.

2. The assembly according to claim 1, wherein:
   said slip cover comprises an inner layer, an outer layer and a middle layer being positioned between said inner layer and said outer layer;
   said seat portion has an upper wall and a perimeter wall extending around a substantial perimeter of said upper wall, said perimeter wall extending downwardly from said upper wall, said perimeter wall having a first lateral side, a second lateral side and a front side, said upper wall having a rear edge, said perimeter wall having a bottom edge;
   said backrest portion has a front wall and a peripheral wall extending around a substantial perimeter of said front wall, said peripheral wall having a first lateral side, a second lateral side and a top side, said front wall having a lower edge, said lower edge being coupled to said rear edge of said upper wall such that said front wall forms an angle with said upper wall;
   said slip cover has a pair of seatbelt holes extending through said upper wall thereby facilitating a pair of seatbelt buckles to be extended through a respective seatbelt holes when said seat portion is positioned on a seat of the bench seat, said seatbelt holes being positioned adjacent to said rear edge of said upper wall; and
   said backrest portion has a pair of cuts each extending through said top side of said peripheral wall and said front wall to terminate at said lower edge of said front wall to define a center console flap between said cuts to facilitate a center console of the bench seat to be positioned in a lowered position.

3. The assembly according to claim 2, wherein each of said straps is positioned on said top side of said peripheral wall of said backrest portion, each of said straps being strategically positioned along said top side to match the location of the respective headrest on the bench seat.

4. The assembly according to claim 2, further comprising a pair of first couplers, each of said first couplers being integrated into a bounding edge of a respective one of said cuts in said front wall of said backrest portion, each of said first couplers comprising a first portion being matable to a second portion, each of said first portion and said second portion extending along opposite sides of said bounding edge of said respective cut for opening and closing said respective cut.

5. The assembly according to claim 2, wherein each of said elastomeric belts has a coupled end being coupled to an intersection between said front side and a respective one of said first lateral side and said second lateral side of said perimeter wall of said seat portion, each of said elastomeric belts having a ring being disposed on a distal end of said elastomeric belts, said ring on each of said elastomeric belts being comprised of a resiliently stretchable material.

6. The assembly according to claim 5, wherein:
each of said securing belts has a coupled end being coupled to said top wall of said seat portion, each of said securing belts extending forwardly along a respective one of said first lateral side and said second lateral side of said perimeter wall of said seat portion;
each of said securing belts has a ring being disposed on a distal end of said securing belts, said ring on each of said elastomeric belts being stretchable around said ring on a respective one of said securing belts; and
said ring on each of said securing belts is comprised of a rigid material thereby facilitating said ring on each of said elastomeric bands to be retained around said ring on said respective securing belt.

7. The assembly according to claim 2, wherein said anchor has a first edge and a second edge, said first edge being coupled an intersection between said rear edge of said upper wall of said seat portion and said lower edge of said front wall of said back portion, said anchor tapering to a point at said second edge thereby facilitating said second edge to slip between the seat and the backrest of the bench seat, said anchor extending rearwardly away from said slip cover such that said anchor is concealed when said slip cover is positioned over the bench seat.

8. The assembly according to claim 2, wherein each of said floor flaps comprises an inner layer, an outer layer and a middle layer being positioned between said inner layer and said outer layer of said floor flaps, each of said floor flaps having a back edge and a front edge, said front edge of each of said floor flaps having an first portion being spaced away from a second portion, said first portion being centrally positioned along said second portion, said first portion having a width being less than a width of said second portion, said back edge of each of said floor flaps being engageable to said bottom edge of said perimeter wall of said seat portion of said slip cover.

9. The assembly according to claim 8, further comprising:
a pair of first couplers; and
a pair of second couplers, each of said second couplers comprising a primary portion being coupled to said bottom edge of said perimeter wall of said seat portion of said slip cover, each of said second couplers comprising a secondary portion being coupled to said back edge of a respective one of said floor flaps, said primary portion of a respective second coupler releasably engaging said secondary portion of said respective second coupler for removably retaining said floor flaps on said seat portion of said slip cover.

10. A bench seat cover assembly for protecting a bench seat and carpet in a vehicle from pet hair and other contaminants, said assembly comprising:
a slip cover having a seat portion forming an angle with a backrest portion thereby facilitating said slip cover to be positioned over a bench seat in a vehicle, said slip cover being comprised of a rip resistant material thereby facilitating domesticated pets to walk on said slip cover without damaging said slip cover, said slip cover being comprised of a fluid impermeable material thereby inhibiting fluid spilled on said slip cover from coming into contact with the bench seat, said slip cover comprising an inner layer, an outer layer and a middle layer being positioned between said inner layer and said outer layer, said seat portion having an upper wall and a perimeter wall extending around a substantial perimeter of said upper wall, said perimeter wall extending downwardly from said upper wall, said perimeter wall having a first lateral side, a second lateral side and a front side, said upper wall having a rear edge, said perimeter wall having a bottom edge, said backrest portion having a front wall and a peripheral wall extending around a substantial perimeter of said front wall, said peripheral wall having a first lateral side, a second lateral side and a top side, said front wall having a lower edge, said lower edge being coupled to said rear edge of said upper wall such that said front wall forms an angle with said upper wall, said slip cover having a pair of seatbelt holes extending through said upper wall thereby facilitating a pair of seatbelt buckles to be extended through a respective seatbelt holes when said seat portion is positioned on a seat of the bench seat, said seatbelt holes being positioned adjacent to said rear edge of said upper wall, said backrest portion having a pair of cuts each extending through said top side of said peripheral wall and said front wall to terminate at said lower edge of said front wall to define a center console flap between said cuts to facilitate a center console of the bench seat to be positioned in a lowered position;
a pair of straps, each of said straps being coupled to said backrest portion of said slip cover, each of said straps forming a closed loop thereby facilitating each of said straps to be positioned around a respective one of a pair of headrests on the bench seat for securing said backrest portion on a backrest of the bench seat, each of said straps being positioned on said top side of said peripheral wall of said backrest portion, each of said straps being strategically positioned along said top side to match the location of the respective headrest on the bench seat;
a pair of first couplers, each of said first couplers being integrated into a bounding edge of a respective one of said cuts in said front wall of said backrest portion, each of said first couplers comprising a first portion being matable to a second portion, each of said first portion and said second portion extending along opposite sides of said bounding edge of said respective cut for opening and closing said respective cut;
a pair of elastomeric belts, each of said first elastomeric belts being coupled to said seat portion of said clip cover, each of said elastomeric belts having a coupled end being coupled to an intersection between said front side and a respective one of said first lateral side and said second lateral side of said perimeter wall of said seat portion, each of said elastomeric belts having a ring being disposed on a distal end of said elastomeric belts, said ring on each of said elastomeric belts being comprised of a resiliently stretchable material;
a pair of securing belts, each of said securing belts being coupled to said seat portion of said clip cover, each of said securing belts being releasably matable to a respective one of said elastomeric belts for securing said set portion on the seat of the bench seat, each of said securing belts having a coupled end being coupled to said top wall of said seat portion, each of said securing belts extending forwardly along a respective one of said first lateral side and said second lateral side of said perimeter wall of said seat portion, each of said securing belts having a ring being disposed on a distal end of said securing belts, said ring on each of said elastomeric belts being stretchable around said ring on a respective one of said securing belts, said ring on each of said securing belts being comprised of a rigid material thereby facilitating said ring on each of said elastomeric bands to be retained around said ring on said respective securing belt;

an anchor being coupled to said slip cover, said anchor sliding between the seat and the backrest of the bench seat when said slip cover is positioned over the bench seat for securing said slip cover to the bench seat, said anchor having a first edge and a second edge, said first edge being coupled an intersection between said rear edge of said upper wall of said seat portion and said lower edge of said front wall of said back portion, said anchor tapering to a point at said second edge thereby facilitating said second edge to slip between the seat and the backrest of the bench seat, said anchor extending rearwardly away from said slip cover such that said anchor is concealed when said slip cover is positioned over the bench seat;

a pair of floor flaps, each of said floor flaps being movably attached to said slip cover, each of said floor flaps extending away from said seat portion of said slip cover thereby facilitating each of said floor flaps to lie on a floor of the vehicle when said slip cover is positioned over the bench seat, each of said floor flaps being comprised of a rip resistant material thereby facilitating domesticated pets to walk on said floor flaps without damaging said floor flaps, each of said floor flaps being comprised of a fluid impermeable material thereby inhibiting fluid spilled on said floor flaps from coming into contact with the floor, each of said floor flaps comprising an inner layer, an outer layer and a middle layer being positioned between said inner layer and said outer layer of said floor flaps, each of said floor flaps having a back edge and a front edge, said front edge of each of said floor flaps having an first portion being spaced away from a second portion, said first portion being centrally positioned along said second portion, said first portion having a width being less than a width of said second portion; and a pair of second couplers, each of said second couplers comprising a primary portion being coupled to said bottom edge of said perimeter wall of said seat portion of said slip cover, each of said second couplers comprising a secondary portion being coupled to said back edge of a respective one of said floor flaps, said primary portion of a respective second coupler releasably engaging said secondary portion of said respective second coupler for removably retaining said floor flaps on said seat portion of said slip cover.

\* \* \* \* \*